United States Patent [19]

van der Valk

[11] 4,214,258
[45] Jul. 22, 1980

[54] PORTABLE TELEVISION CAMERA AND TAPE RECORDER COMBINATION

[75] Inventor: Nicolaas J. L. van der Valk, Breda, Netherlands

[73] Assignee: U.S. Philips Corporation, New York, N.Y.

[21] Appl. No.: 958,321

[22] Filed: Nov. 6, 1978

[30] Foreign Application Priority Data

Dec. 7, 1977 [NL] Netherlands ............ 7713500

[51] Int. Cl.² .............. H04N 5/76; H04N 9/62; H04N 9/04
[52] U.S. Cl. ....................... 358/4; 358/10; 358/139
[58] Field of Search .............. 358/4, 10, 139

[56] References Cited
U.S. PATENT DOCUMENTS

4,158,208  6/1979  Dischert ............ 358/10

Primary Examiner—Robert L. Richardson
Attorney, Agent, or Firm—Thomas A. Briody; William J. Streeter; Edward W. Goodman

[57] ABSTRACT

A portable television camera and tape recorder combination wherein, prior to recording a scene, the signal of a bar generator is first recorded on a tape for test and reference purposes. After the preparations for recording the scene, wherein use is made of a view finder, the bar generator must be switched off and the camera signal must be recorded on the tape. By way of non-disturbing indication in the image on the view finder that the bar generator is switched on, the signal thereof is added, after differentiation, to the camera signal and displayed on the view finder.

3 Claims, 1 Drawing Figure

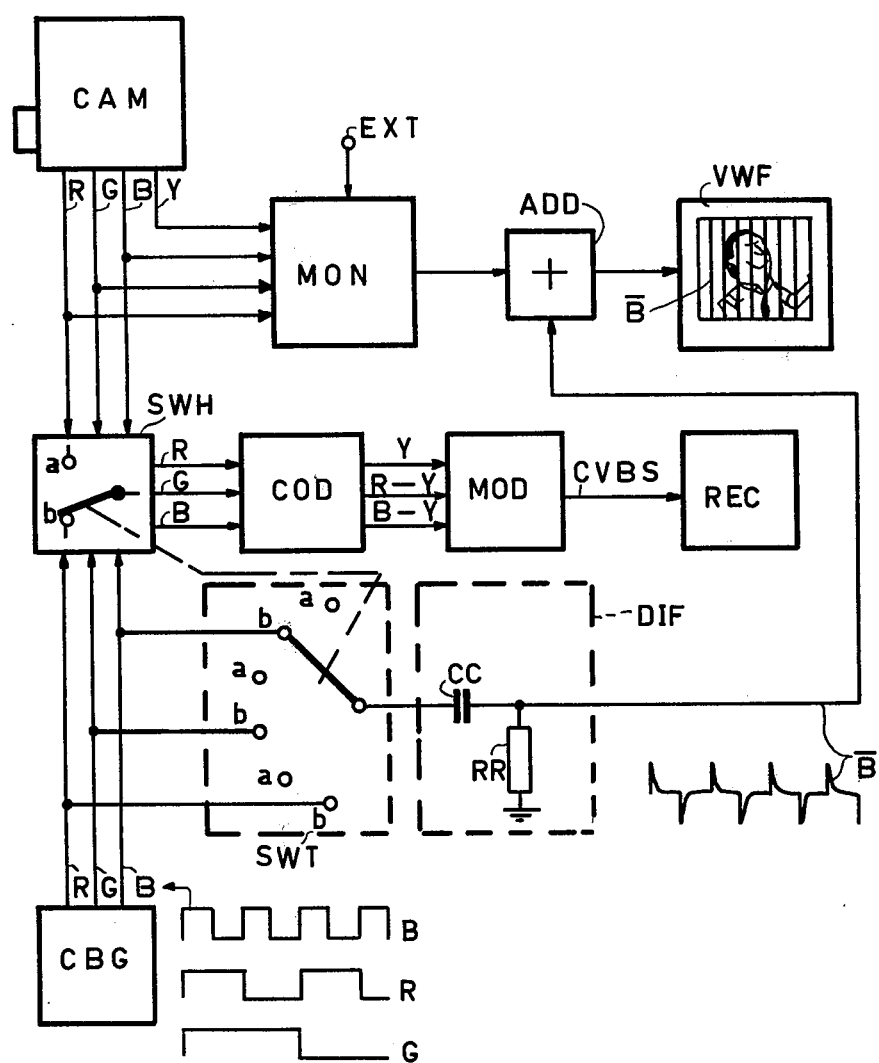

PORTABLE TELEVISION CAMERA AND TAPE RECORDER COMBINATION

BACKGROUND OF THE INVENTION

The invention relates to a portable television camera and tape recording combination comprising a camera, a tape recording device, a bar generator for testing purposes at the tape recording device, a monitoring device for supplying a signal to a view finder and a change-over device for supplying the signal of the camera and the bar generator, respectively, to the tape recording device.

Such a portable combination is generally operated by one person. This person prepares the recording of a scene by viewing the camera signal in the view finder while the bar signal is simultaneously applied to the tape recorder for testing purposes. This signal is used as a reference signal during subsequent playing of the tape, signal correction being applied depending on distortions present in this reference signal.

When the operator proceeds from preparing the recording to actual recording, he must stop the recording of the test reference signal in the tape recorder and proceed to recording of the camera signal. Omitting to switch off the test signal results in a faulty scene recording. To prevent this it is advantageous to give an indication in the image in the view finder during recording of the test signal. However, the image in the view finder must be affected to the least possible extent, so that the preparation of a recording can be effected with the least possible disturbance for the operator.

SUMMARY OF THE INVENTION

It is an object of the invention to provide a portable television camera and tape recorder combination with which the operator receives a clear, non-disturbing indication about the recording of the test reference signal during the preparation of a recording, which indication must, however, not be overlooked when the operator changes over to recording the scene, so that the test signal recording will be stopped in time. A portable combination according to the invention is therefore characterized in that the combination comprises a series arrangement of a signal differentiating circuit and an on-off switching device coupled to said change-over device, the series arrangement being provided between an output of the bar generator and an input of a superposition stage connected to the output of the monitoring device by means of another input, while the output of the superposition stage is connected to the output of the view finder.

The result is that, due to the signal differentiation, a plurality of vertical lines, bright and dark, respectively, are present in the image in the view finder which do not disturb the operator in the preparation of his recording, but cannot be overlooked as an indication. Depending on the local brightness in the image in the view finder the bright or the dark lines are more apparent.

As a color bar pattern is used as the test signal in color television, which signal is composed of three basis color signals having different repetition rates namely a green, red and blue color signal, each having double the frequency of the previous color, a portable color television combination comprising a color bar generator is characterized in accordance with the invention, in that the differentiating circuit is connected to the outputs of the color bar generator via a multiple on-off switching device.

This results in the operator being able to adjust the spacing between the lines in the vertical line pattern at will.

If the use of the described multiple on-off switching device is refrained from, then it appears that, in practice, the combination which should be preferred is characterized in that that output of the color bar generator at which a signal is present which has a higher repetition rate than the signals at the other outputs, is connected to the series arrangement of the differentiating circuit and the on-off switching device.

DESCRIPTION OF THE DRAWINGS

The invention will be further explained by way of non-limitative example with reference to the accompanying FIGURE showing, in block diagram form, an embodiment of the invention.

DESCRIPTION OF THE PREFERRED EMBODIMENT

In the FIGURE a portable television camera is denoted by CAM. The portable camera CAM may be of any construction provided that that the camera CAM records a scene and converts the information thereof into one or more video signals as customary for black-white or color television. The camera CAM is shown in the drawing as a color television camera supplying, for example, three color signals R, G and B associated with the red, green and blue, respectively, colored information in the scene and which supplies a luminance signal Y which, whether or not generated separately, consists of a combination of the color signals laid down in television standards, for example $Y = 0.30\ R + 0.59\ G + 0.11\ B$. The signals R, G, B and Y originating from the camera CAM are supplied to a monitoring device MON, to which an external signal EXT can also be applied. The device MON ensures the supply of the signals, separately or in combination, to a view finder VWF via a superposition stage ADD.

The signals R, G and B of the camera CAM are furthermore applied to one set of inputs of a change-over device SWH, while the signals R, G and B of a color bar generator CBG are applied to another set inputs thereof. The change-over device SWH comprises three outputs at which, according to the wishes of the operator of camera CAM, the signals R, G, B originating from the camera CAM or from the color bar generator CBG are present. The outputs of the device SWH are connected to inputs of a coding device COD, at which outputs the luminance signal Y and two color difference signals, R-Y and B-Y, are produced. The outputs of the coding device COD are connected to inputs of a modulating device MOD which supplies in known manner a composite color television signal CVBS containing color-video information and line and field blanking and synchronizing information. The output of the modulator MOD with the signal CVBS is connected to an input of a tape recorder REC.

With the exception of the superposition stage ADD, the above-mentioned components are included in a combination of a portable television camera and tape recorder combination which is known in practice. According to the invention, this combination further comprises a signal differentiating circuit DIF the output of which is connected to the superposition stage ADD and the input to one of the outputs R, G or B of the color bar generator CBG via an on-off switching device SWT. The switching devices SWH and SWT are coupled one to the other, which is indicated by the contact indications a and b and by means of the dashed line. The drawing shows the simplest possible implementation of the differentiating circuit DIF, comprising a capacitor CC and a resistor RR. Starting from the signals B, R and G, shown in the FIGURE at the color bar generator CBG, the on-off switching device SWT passes the signal B with the highest repetition rate, which furnishes the differentiated signal $\overline{B}$ for supply to the superposition stage ADD. In the view finder VWF the drawing shows schematically the effect obtained when on the one hand the signals R, G and B of the camera CAM are supplied, and the supply of the signal $\overline{B}$ on the other hand. The result is that the person operating the camera CAM observes the scene information in the image of the view finder and sees a plurality of vertical bright and dark lines, respectively, in the image in the view finder as an indication that the color bar generator CBG is connected via the change-over device SWH to the tape recorder REC for supplying the test reference signal required before a scene is recorded on the tape. The alternately bright and dark lines differ in appearance depending on the local brightness in the image in the view finder. In a bright and dark, portion of the image, the dark and bright lines, respectively, will be more apparent.

The on-off switching device SWT is shown in the drawing as a multiple, particularly, a three-pole, on-off switching device. A comparison in the drawing of the signals B, R and G of the color bar generator CBG shows that, when the signal G is chosen instead of the signal B for supply to the differentiating circuit DIF, the line pattern in the image on the view finder VWF comprises only one fourth of the plurality of lines shown in the drawing.

In practice the choice of the signal B with the fourfold repetition rate of the signal G appeared to be very satisfactory.

Instead of the sequence shown in the drawing of the on-off switching device SWT and the differentiating circuit DIF in the series arrangement, this sequence might also be reversed. For black-white television and color television where a single on-off switching device is used, the change in sequence has no effect. The embodiment possible for color television comprising the three-fold on-off switching device would, however, require three-differentiating circuits instead of one.

What is claimed is:

1. A portable television camera and tape recorder combination comprising a camera, a tape recording device, a bar generator for testing purposes at the tape recording device, a monitoring device for signal supply to a view finder and a change-over device for supplying the signal of the camera and bar generator, respectively, to the tape recording device, wherein the combination further comprises a superposition stage, coupled between said monitoring device and said view finder, having a first input connected to said monitoring device, a second input, and an output connected to said view finder, and a series arrangement of a signal differentiating circuit and an on-off switching device coupled to said change-over device, said series arrangement being provided between the output of the bar generator and the second input of said superposition stage, whereby when said tape recording device is being supplied with signals from said bar generator, a visual pattern will appear in said view finder indicative of this condition.

2. A portable television camera and tape recorder combination as claimed in claim 1, suitable for color television and comprising a color bar generator, wherein the differentiating circuit is connected to the outputs of the color bar generator via a multi-pole on-off switching device.

3. A portable television camera and tape recorder combination as claimed in claim 1, suitable for color television and comprising a color bar generator, in which the output signal of the color bar generator, having a higher repetition rate than the other signals therefrom, is connected to the series arrangement of the differentiating circuit and the on-off switching device.

* * * * *